(12) United States Patent
Brogan et al.

(10) Patent No.: US 12,328,008 B2
(45) Date of Patent: Jun. 10, 2025

(54) METHOD OF SUPPLYING POWER TO A WIND FARM IN A LOW WIND CONDITION

(71) Applicant: Siemens Gamesa Renewable Energy A/S, Brande (DK)

(72) Inventors: Paul Brian Brogan, Glasgow (GB); Douglas Elliott, Glasgow (GB); Thyge Knueppel, Værløse (DK); Andrew Roscoe, Glasgow (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/287,326

(22) PCT Filed: Mar. 22, 2022

(86) PCT No.: PCT/EP2022/057491
§ 371 (c)(1),
(2) Date: Oct. 18, 2023

(87) PCT Pub. No.: WO2022/228784
PCT Pub. Date: Nov. 3, 2022

(65) Prior Publication Data
US 2024/0195183 A1    Jun. 13, 2024

(30) Foreign Application Priority Data
Apr. 28, 2021   (EP) .................................... 21170870

(51) Int. Cl.
*H02J 3/46*     (2006.01)
*H02J 3/38*     (2006.01)

(52) U.S. Cl.
CPC .............. *H02J 3/472* (2020.01); *H02J 3/381* (2013.01); *H02J 2300/28* (2020.01)

(58) Field of Classification Search
CPC ........ H02J 3/472; H02J 3/381; H02J 2300/28; H02J 3/50; H02J 3/48; Y02E 10/72; Y02E 10/76
See application file for complete search history.

(56) References Cited

U.S. PATENT DOCUMENTS

| | | | |
|---|---|---|---|
| 2010/0327599 A1* | 12/2010 | Nielsen ................. | F03D 7/0284 290/55 |
| 2012/0242295 A1* | 9/2012 | Bech ....................... | H02J 3/388 322/87 |

(Continued)

FOREIGN PATENT DOCUMENTS

| | | |
|---|---|---|
| EP | 3204636 A1 | 8/2017 |
| EP | 3204636 B1 | 8/2019 |

(Continued)

OTHER PUBLICATIONS

International Search Report & Written Opinion for PCT/EP2022/057491, issued on Jul. 11, 2022.

*Primary Examiner* — Lincoln D Donovan
*Assistant Examiner* — Alex W Lam
(74) *Attorney, Agent, or Firm* — Schmeiser, Olsen & Watts LLP (57) ABSTRACT

A method of supplying power to an electrically isolated wind farm is provided including a plurality of wind turbines and a power generator. In a low wind condition, where a wind speed falls below a threshold value, active power and reactive power is supplied from the power generator to a first wind turbine and wind farm passive components. In a second operation mode after the first operation mode, active power is supplied from the power generator to the first wind turbine and a second wind turbine, and reactive power is supplied/consumed by the first wind turbine to the cables and transformers between it and the second wind turbine.

12 Claims, 4 Drawing Sheets

(56) References Cited

U.S. PATENT DOCUMENTS

| | | | | |
|---|---|---|---|---|
| 2013/0038133 A1* | 2/2013 | Bech | ................. | H02J 3/381 |
| | | | | 307/83 |
| 2017/0009743 A1* | 1/2017 | Brogan | ................. | F03D 7/042 |
| 2021/0047997 A1 | 2/2021 | Abeyasekera | | |

FOREIGN PATENT DOCUMENTS

| | | |
|---|---|---|
| EP | 3 533 996 A1 | 9/2019 |
| EP | 3 641 090 A1 | 4/2020 |
| WO | 2016/054799 A1 | 4/2016 |

\* cited by examiner

METHOD OF SUPPLYING POWER TO A WIND FARM IN A LOW WIND CONDITION

CROSS-REFERENCE TO RELATED APPLICATIONS

This application claims priority to PCT Application No. PCT/EP2022/057491, having a filing date of Mar. 22, 2022, which claims priority to European Application No. 21170870.6, having a filing date of Apr. 28, 2021, the entire contents both of which are hereby incorporated by reference.

FIELD OF TECHNOLOGY

The following relates to a method of supplying power to an electrically islanded wind farm in a low wind condition, and to such a wind farm.

BACKGROUND

A conventional wind farm comprises a plurality of wind turbines which are connected in parallel to each other in a plurality of strings, which can also be referred as arrays. A power generator is connected to the wind farm to supply electric power to the wind turbines in the strings when there is no grid connection available. A control device is provided which is configured to operate the wind farm in several operation modes.

In a low wind condition, where a wind speed falls below a threshold value, an electrically isolated wind farm can perform a so-called black start (or self-energising mode) itself or remain energized with the aid of a relatively small additional power source. Such an additional power source may take the form of a diesel, or other fuel powered generator, a photovoltaic or energy storage device, or a combination of some or all of the above.

When isolated or islanded from an electrical grid, the wind turbines can maintain the AC frequency and voltage within the island by exchanging active and reactive power with via passive components such as cables and transformers. However, when the wind conditions are low, the wind turbines are not able to supply active power, and an additional power source is necessary.

By remaining energized in this situation, the wind turbine power converters operate in a voltage support mode (Vmode), which could also be called reactive power support mode, where the whole electrical current capability of the wind turbine converters is available for exporting and/or importing reactive power. This brings the ability to maintain the energized state to the wind farm and therefore the climatic control within the turbines, it also allows them to be available for energising components of the electrical grid. The later situation could allow the wind farm to be a key future contributor in the black start of the wider electrical grid, where large transformers and transmission lines can be back energized from the wind farm using the full capacity of the wind turbine power converters.

SUMMARY

An aspect relates to supplying power to a wind farm in a low wind condition, and such a wind farm, where a size of the additional energy source, which is required when the wind conditions are low, is only large enough to supply auxiliary and electrical losses of the wind farm and its grid components, which typically amounts to less than 1% of the wind farm rated power, in contrast to being large enough to handle both the reactive and active power loads of the wind farm if the wind turbine converters are not involved. Reactive loads of the wind farm are often significantly larger than 1% and depend on the lengths of cables between wind turbines.

According to a first aspect of embodiments of the invention, a method of supplying power to a wind farm is provided. The wind farm comprises a plurality of wind turbines which are connected n parallel to each other in a first string, wherein respective cable section circuit breakers are arranged between adjacent wind turbines of the first string: and a power generator which is connected to a first wind turbine of the first string, wherein a first string circuit breaker is arranged in a line between the power generator and the first wind turbine. In embodiments, the method comprises the following operation modes in a low wind condition, where a wind speed falls below a threshold value: a first operation mode where the first-string circuit breaker is closed to supply active power from the power generator to the first wind turbine and to supply or consume reactive power from or to the power generator to or from a passive cable and/or transformer between the power generator and the first wind turbine, while the remaining cable section circuit breakers in the first string are opened: and a second operation mode after the first operation mode, where a cable section circuit breaker between the first wind turbine and an adjacent second wind turbine is closed to supply active power from the power generator to the first and second wind turbines and to supply or consume reactive power from or to the first wind turbine to or from the passive cable and/or transformer between the first wind turbine and the second wind turbine, while the remaining cable section circuit breakers in the first string are opened.

The passive components of the cables and transformers between the power generator and first wind turbine require an exchange of reactive power with the power generator. The term "exchange" can be used because cables tend to produce reactive power, and transformers tend to consume reactive power. The production and consumption of each component tends not to be balanced, and therefore the power generator is useful to compensate for the difference by either consuming or supplying. In a wind farm, the cable reactive power production tends to dominate the consumption of the transformers, and therefore the power generator must consume reactive power to achieve the balance.

As more cables are connected, the wind turbines are required to assist in making this balance also by consuming reactive power as the power generator would not be sized to be able to do this. The reactive power flow in a wind farm, when wind is low, will dominate the active power flow which supplies auxiliaries of the wind turbines and covers power losses.

The second operating mode is also used to sequentially energize wind turbines of the first string other than the first and second wind turbines.

In an embodiment, the wind farm comprises n wind turbines in the first string, wherein the first wind turbine is the most upstream wind turbine in the first string and the n-th wind turbine is the most downstream wind turbine in the first string. In embodiments, the method comprises sequentially closing the cable section circuit breakers starting out from the cable section circuit breaker between the first and second wind turbines up to a cable section circuit breaker between the n-th wind turbine and the n−1-th wind turbine, thereby sequentially supplying active power from the power generator to the first to n-th wind turbines and sequentially supplying or consuming reactive power from or to the wind turbines to or from a respective downstream passive cable and/or transformer.

In a third operating mode, the n wind turbines of the first string can be used to energize the m wind turbines of the second string. In a fourth operating mode, a minimum number of energized wind turbines can act alongside the power generator to energize a grid line that comprises a grid transformer and transmission lines. The power generator will supply active power to the wind turbines and the grid line, whereas the wind turbines will supply or consume reactive power to or from the grid line to control the voltage.

In an embodiment, the wind farm further comprises at least one further plurality of wind turbines which are connected in parallel to each other in at least one further string, wherein respective cable section circuit breakers are arranged between adjacent wind turbines of the at least one further string: wherein the power generator is connected to a first wind turbine of the at least one further string, wherein at least one further string circuit breaker is arranged in a line between the power generator and the first wind turbine of the at least one further string. In embodiments, the method further comprises, after closing the wind turbine circuit breaker between the n-th wind turbine and the n−1-th wind turbine of the first string, performing the first and second operation modes in the at least one further string in the same manner as in the first string as described above, and/or performing sequentially closing the cable section circuit breakers in the at least one further string in the same manner as in the first string as described above: wherein reactive power is also supplied or consumed from or to the wind turbines of the first string to or from the passive cable and/or transformer of the further string.

In an embodiment, the wind farm further comprises a grid supply line which is connected via a grid supply line circuit breaker to a bus bar between the first wind turbine and the power generator, wherein, if a minimum number of wind turbines in the wind farm is supplied by active power, the grid supply line circuit breaker is closed to supply active power and supply or consume reactive power from or to the bus bar between the first wind turbine and the power generator to or from the grid supply line. The power generator could be connected to any point in the wind farm and will be located according to site conditions, depending on where there is an available connection point.

In an embodiment, the grid supply line is connected to a grid via a grid circuit breaker, at its distant end, wherein the grid supply line comprises, between the grid supply line circuit breaker and the grid circuit breaker, a grid transformer and/or a transmission line, wherein the grid circuit breaker is opened when performing the above-described steps.

In an embodiment, the wind farm comprises at least one of the following: each wind turbine in the first string comprises a corresponding wind turbine connection circuit breaker to connect or interrupt the respective wind turbine to or from the first string: each wind turbine in the at least one further string comprises a corresponding wind turbine circuit breaker to connect or interrupt the respective wind turbine to or from the at least one other string: and the power generator is connected to the first string via a power generator circuit breaker, wherein the power generator circuit breaker is closed in the low wind condition and opened in conditions other than the low wind condition.

According to a further aspect of embodiments of the invention, a wind farm is provided. The wind farm comprises a plurality of wind turbines which are connected in parallel to each other in a first string, wherein respective cable section circuit breakers are arranged between adjacent wind turbines of the first string: a power generator which is connected to a first wind turbine of the first string, wherein a first string circuit breaker is arranged in a line between the power generator and the first wind turbine: and a control device which is configured to operate the wind farm in the following operation modes in a low wind condition, where a wind speed falls below a threshold value: a first operation mode where the first string circuit breaker is closed to supply active power from the power generator to the first wind turbine and to supply or consume reactive power from or to the power generator to or from the passive cable and/or transformer between the power generator and the first wind turbine, while the remaining cable section circuit breakers in the first string are opened: and a second operation mode after the first operation mode, where a cable section circuit breaker between the first wind turbine and an adjacent second wind turbine is closed to supply active power from the power generator to the first and second wind turbines and to supply or consume reactive power from or to the first wind turbine to or from the passive cable and/or transformer between the first wind turbine and the second wind turbine, while the remaining cable section circuit breakers in the first string are opened.

A different control device may be used to close these circuit breakers as it may be owned under the regime of a grid operator instead of a wind farm operator.

In an embodiment, the wind farm comprises n wind turbines in the first string, wherein the first wind turbine is the most upstream wind turbine in the first string and the n-th wind turbine is the most downstream wind turbine in the first string. The control device is configured to
sequentially close the cable section circuit breakers starting out from the cable section circuit breaker between the first and second wind turbines up to a cable section circuit breaker between the n-th wind turbine and the n−1-th wind turbine, thereby sequentially supplying active power from the power generator to the first to n-th wind turbines and sequentially supplying or consuming reactive power from or to the wind turbines to or from a respective downstream passive cable and/or transformer.

In an embodiment, the wind farm further comprises at least one further plurality of wind turbines which are connected in parallel to each other in at least one further string, wherein respective cable section circuit breakers are arranged between adjacent wind turbines of the at least one further string: wherein the power generator is connected to a first wind turbine of the at least one further string, wherein at least one further string circuit breaker is arranged in a line between the power generator and the first wind turbine of the at least one further string, wherein, after closing the wind turbine circuit breaker between the n-th wind turbine and the n−1-th wind turbine of the first string, the control device is further configured to perform the first and second operation modes in the at least one further string in the same manner as in the first string as described above, and/or perform sequentially closing the cable section circuit breakers in the at least one further string in the same manner as in the first string as described above: wherein reactive power is also supplied or consumed from or to the wind turbines of the first string to or from a passive cable and/or transformer of the further string.

In an embodiment, the wind farm further comprises a grid supply line which is connected via a grid supply line circuit breaker to a bus bar between the first wind turbine and the power generator, wherein, if a minimum number of wind turbines in the first string is energized, the control device is configured to close the grid supply line circuit breaker to supply active power and supply or consume reactive power from or to the bus bar between the first wind turbine and the power generator to or from the grid supply line.

In an embodiment, the grid supply line is connected to a grid via a grid circuit breaker, wherein the grid supply line comprises, between the grid supply line circuit breaker and the grid circuit breaker, a grid transformer and/or a transmission line, wherein the control device is configured to open the grid circuit breaker when performing the above-described steps.

In an embodiment, the wind farm comprises at least one of the following: each wind turbine in the first string comprises a corresponding wind turbine circuit breaker to connect or interrupt the respective wind turbine to or from the first string: each wind turbine in the at least one further string comprises a corresponding wind turbine circuit breaker to connect or interrupt the respective wind turbine to or from the at least one other string: and the power generator is connected to the first string via a power generator circuit breaker, wherein the control device is configured to close the power generator circuit breaker in the low wind condition and opened in conditions other than the low wind condition.

The use of a small additional power source to energize and supply the active power requirements of the wind turbine power converters allows the reactive power balancing and transient current capability of the wind turbine power converters to be available for further energising the wind farm and large transmission system components. The availability of the full capacity of the wind turbine power converters allows the size of the additional energy source to be significantly reduced so that it is only needed to supply the active power losses/loads.

There are two applications where such a capability could be used:

1) A national power system has itself experienced a black out and needs to be re-energized. The wind farm can self-energize, regardless of available wind speeds, and contribute to the re-energisation by:
  a) Back energizing components within the electrical transmission system such as transformers and transmission lines. Such components present reactive power loads to the power system and their energization can introduce large transients reaching and beyond a steady-state rating of the wind farm and far beyond a rating of the additional energy source, therefore the collective reactive power capability of the wind turbine power converters can support their energisation and steady state operation: the additional energy source alone cannot do this. The energization of such components can then facilitate the connection of further generators or the connection of interconnectors to other already energized portions of the system.
  b) Synchronizing to the voltage of the already energized transmission system and connect the wind farm without introducing large transients and immediately support the further restoration process of the power system with the voltage/reactive power support capability of the wind turbine power converters. In this case, the transmission system up to the wind farm has been energized by another generator and the connection of the wind farm allows it to provide voltage support and reactive power balancing that could be critical to energize further portions of the transmission system.

2) The wind farm is isolated from the transmission system due to a grid component outage (due to maintenance or failure), but is required to energize itself, or to remain energized, to maintain the climatic and/or other auxiliary systems. Periods where the wind is too low for power production are often short in duration (hours, possibly 1-2 days maximum), therefore the ability of the wind farm to remain energized, using the additional power source, removes the need for repeated de-energisations and re-energisations as the wind speed falls and returns.

When energising a wind farm in the low wind condition, the initial energisation sequence is advantageous so as not to overload the additional power source. In the initial stage, it needs only to energize the connection between the power source and the first wind turbine. Once the first wind turbine has been energized, it will become the dominant contributor of reactive power allowing further wind turbines to be sequentially energized by direct online closure of the respective circuit breakers (wind turbine medium voltage (MV) circuit breakers). Once a minimum number of wind turbines has been connected, they are then able to energize larger electrical components, for example larger portions of the wind farm or local transmission system components.

In the low wind condition, up to now; the conventional energisation of an isolated wind farm and/or transmission system components using the wind turbines was not possible. In previous cases, where isolated wind farms have been energized without using the grid, a much larger additional power source and careful switching of inductive reactive power compensation equipment has been used. When combined, they are capable of supporting the active power loads and providing reactive power balance and voltage support within the wind farm. The energisation of a wind farm using such equipment was very sensitive to unexpected connections or disconnections of cable sections which can lead to overloading of the equipment due to reactive power imbalances. The energisation of transmission system components using such a combination of generator and reactive power compensation equipment according to embodiments of the present invention brings along many advantages as described above.

It has to be noted that embodiments of the invention have been described with reference to different subject matters. In particular, some embodiments have been described with reference to apparatus type claims whereas other embodiments have been described with reference to method type claims. However, a person skilled in the conventional art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION

Some of the embodiments will be described in detail, with reference to the following figures, wherein like designations denote like members, wherein.

DETAILED DESCRIPTION

The following figures are intended to demonstrate a sequential energization process of a wind farm from a small additional power source.

Figure 1:
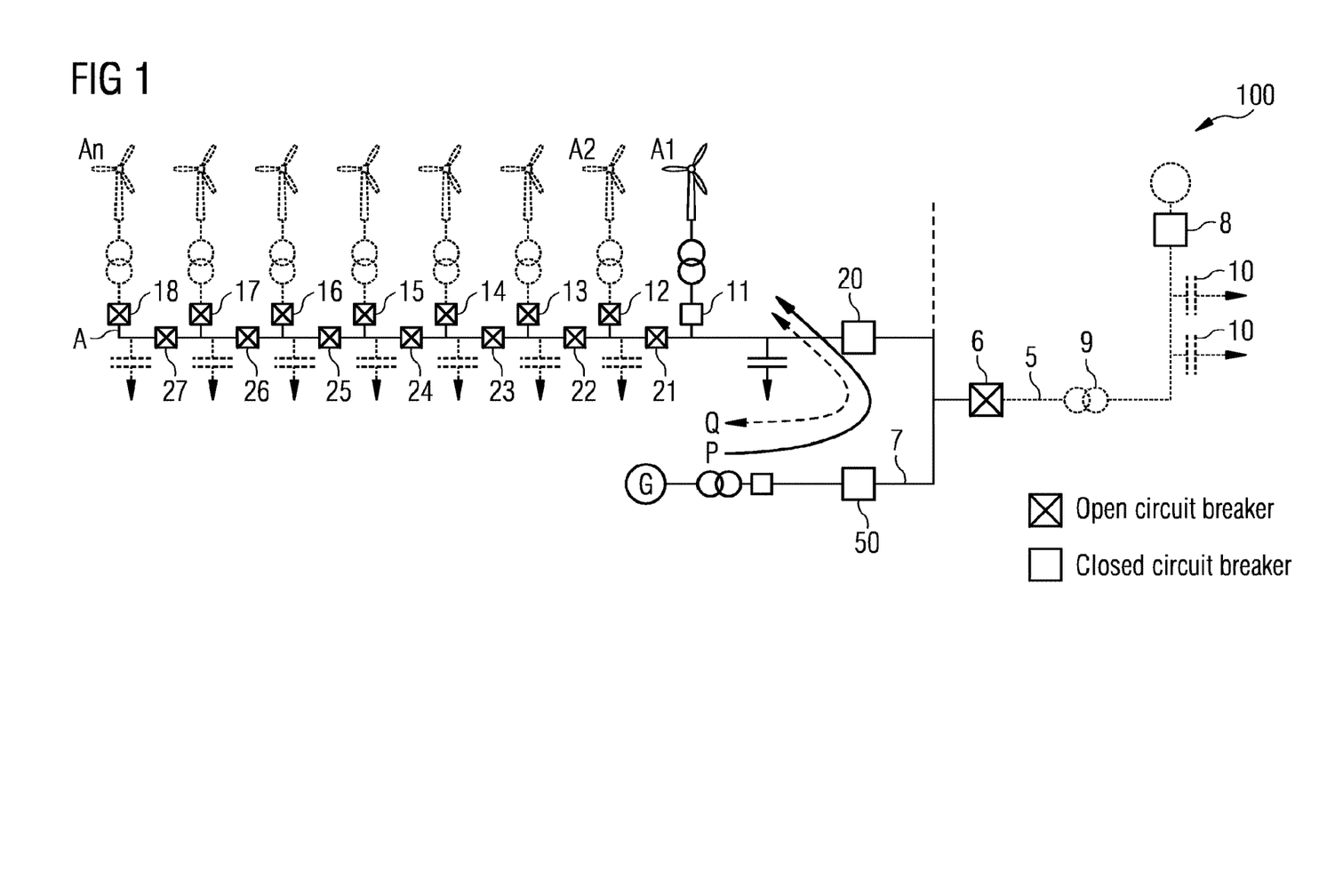
FIG. 1 shows a wind farm in a first operation mode in a low wind condition.

FIG. 1 shows a wind farm which is controlled by a control device (not shown) in several operation modes, where a power generator G is supplying active power P to a first wind turbine A1 and balancing reactive power Q of passive cables and transformers therebetween, while the first wind turbine A1 is energized. FIG. 1 shows the wind farm in a first operation mode in a low wind condition, where a wind speed falls below a threshold value. The wind farm comprises a plurality of wind turbines A1, A2, . . . , An which are connected in parallel to each other in a first-string A, which can be a string cable, wherein respective cable section circuit breakers 21, 22, 27 are arranged between adjacent wind turbines of the first-string A.

Each wind turbine A, A2, . . . , An in the first-string A further comprises a corresponding wind turbine circuit breaker 11, 12, . . . , 18 to connect or interrupt the respective wind turbine A, A2, . . . , An to or from the first-string A.

The wind farm comprises a power generator G, for example a diesel generator or any other type of power source, which is connected to a first wind turbine A1 of the first-string A, wherein, amongst others, a first-string circuit breaker 20 is arranged in a line between the power generator G and the first wind turbine A1. The power generator G is connected to the first-string A via a power generator circuit breaker 50.

The wind farm is operated in various operation modes in low wind condition, where the wind speed falls below the threshold value. The power generator circuit breaker 50 is closed in the low wind condition and can be opened in conditions other than the low wind condition. In a first operation mode of FIG. 1, the first-string circuit breaker 20 is closed to supply active power P from the power generator G to the first wind turbine A1 and to supply/consume reactive power Q from/to the power generator G to the cables and transformers between the power generator and the first wind turbine A1, while the remaining cable section circuit breakers 21, 22, . . . , 27 in the first-string A are opened.

In FIG. 1, the power generator G energizes a first section, i.e., the first wind turbine A1 of the first-string A, thereby supplying active to the first wind turbine A1 and balancing the reactive power of the cable and transformers between.

Figure 2:
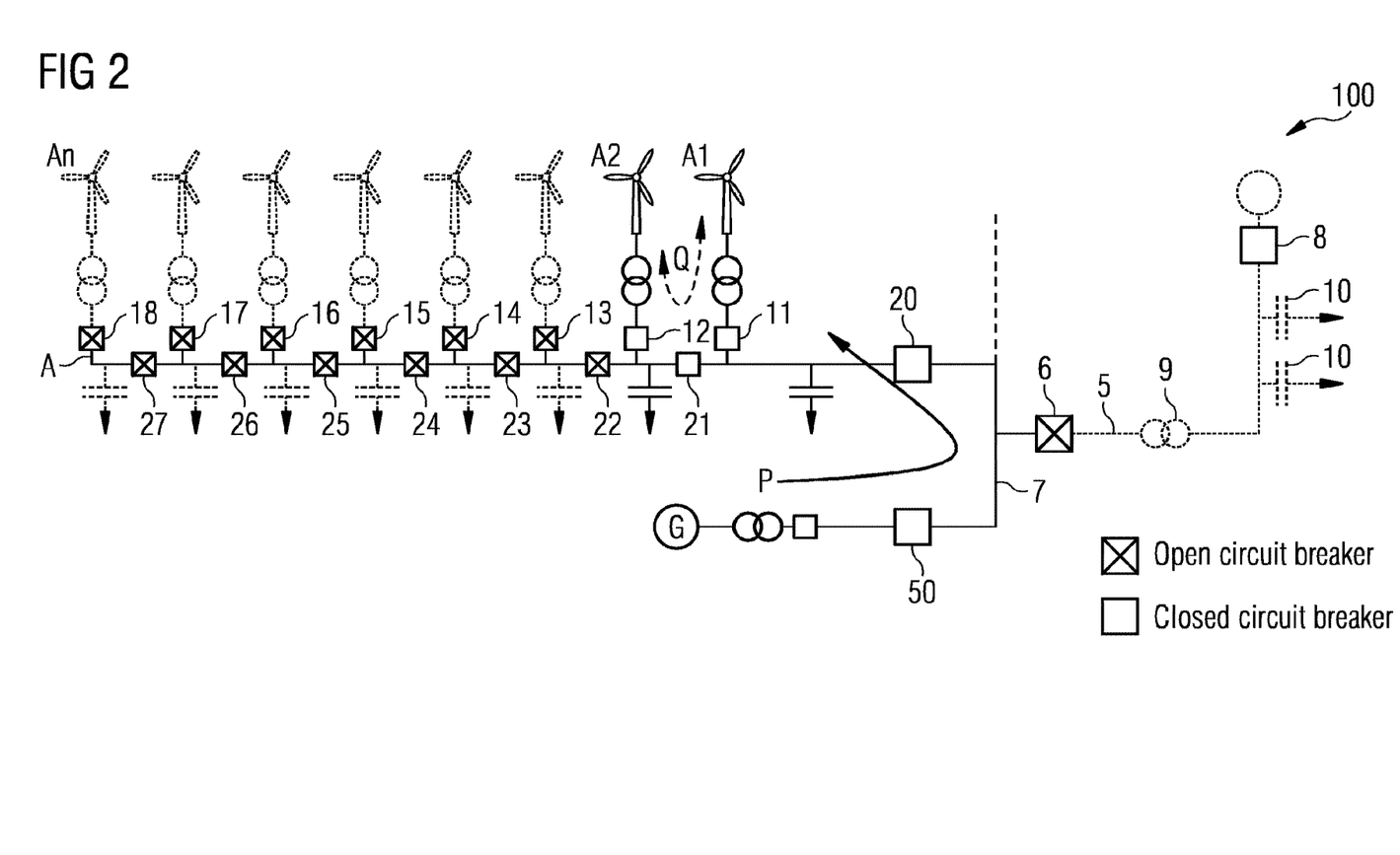
FIG. 2 shows the wind farm in a second operation mode in a low wind condition.

FIG. 2 shows the wind farm in a second operation mode in the low wind condition after the first operation mode, where the power generator G is supplying active power P to the first and second wind turbines A1, A2, and the circuit breakers between the first and second wind turbines A1, A2 are closed. The first wind turbine A1 is balancing the reactive power Q of the cable and transformers, while the second wind turbine A2 is energized. A cable section circuit breaker 21 between the first wind turbine A1 and an adjacent second wind turbine A2 is closed to supply active power P from the power generator G to the first and second wind turbines A1, A2 and to supply reactive power Q from the first wind turbine A1 to the second wind turbine A2, while the remaining cable section circuit breakers 22, 23, . . . , 27 in the first-string A are opened.

In other words, the wind farm comprises n wind turbines A1, A2, . . . , An in the first-string A, wherein the first wind turbine A1 is the most upstream wind turbine in the first-string A and the n-th wind turbine An is the most downstream wind turbine in the first-string A. During the first and second operation modes, the cable section circuit breakers 21, 22, . . . , 27 are sequentially closed starting out from the cable section circuit breaker 21 between the first and second wind turbines A1, A2 up to a cable section circuit breaker 27 between the n-th wind turbine An and the n−1-th wind turbine An−1, thereby sequentially supplying active power P from the power generator G to the first to n-th wind turbines A1, A2, . . . , An and sequentially supplying reactive power Q from or to the wind turbines to balance reactive power loads of the cables and transformers.

In FIG. 2, once the first wind turbine A1 is energized, the wind farm is then able to energize the second wind turbine A2 and the cables and transformer in between using its reactive power capability, while the power generator G supplies the active power load to both of them. The rest of the wind turbines in the first-string A can now be energized sequentially one after the other along with the remainder of the first-string A, if required. The reactive power Q of the first-string A can be dominantly balanced by the wind turbines as soon as one or more of them is operating.

Figure 3:
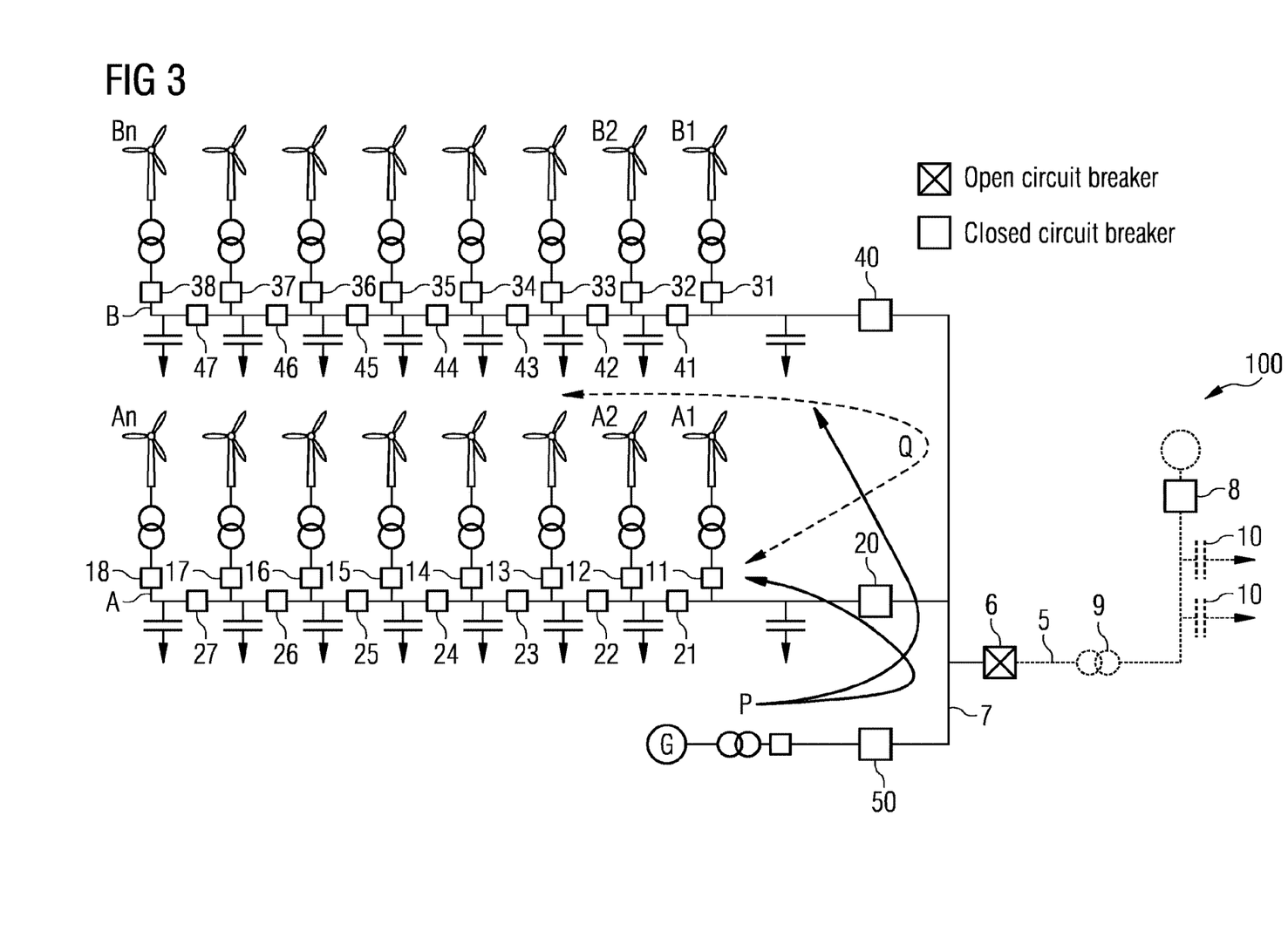
FIG. 3 shows the wind farm in another operation mode after the second operation mode.

FIG. 3 shows the wind farm in another operation mode after the second operation mode, where the circuit breakers between the n wind turbines of the first-string A are closed and the power generator G is supplying active power P to the first-string A of wind turbines, while the wind turbines balance the reactive power Q of the cables and transformers. The circuit breaker to the second string B and circuit breakers to the n wind turbines of the second string B are also closed, allowing the power generator G to supply active power P to the n wind turbines of the second string B and the n wind turbines of the first-string A to balance the reactive power load of the second string cables and transformers, while the n wind turbines of the second string B are energized. The wind farm further comprises at least one further plurality of wind turbines B1, B2 . . . , Bn which are connected in parallel to each other in at least one further string B, wherein respective cable section circuit breakers 41, 42, . . . , 47 are arranged between adjacent wind turbines of the at least one further string B. The first wind turbine B1 is the most upstream wind turbine in the further string B and the n-th wind turbine Bn is the most downstream wind turbine in the further string B. Each wind turbine B, B2, Bn in the at least one further string B further comprises a corresponding wind turbine circuit breaker 31, 32, . . . , 38 to connect or interrupt the respective wind turbine B, B2, . . . , Bn to or from the at least one other string B.

The power generator G is also connected to a first wind turbine B1 of the at least one further string B, wherein at least one further string circuit breaker 40 is arranged in a line between the power generator G and the first wind turbine B1 of the at least one further string B. After closing the wind turbine circuit breaker 18 between the n-th wind turbine An and the n−1-th An−1 wind turbine of the first-string A, the first and second operation modes are performed in the at least one further string B in the same manner as in the first-string A like in FIGS. 1 and 2. In other words, the cable section circuit breakers 41, 42, . . . , 47 in the at least one further string B are sequentially closed in the same manner as in the first-string A like in FIGS. 1 and 2. Reactive power Q is also supplied from the wind turbines of the first-string A to the cables and transformers of the further string B.

That means, in a first operation mode, the further string circuit breaker 40 is closed to supply active power P from the power generator G to the first wind turbine B1 and to supply reactive power Q from or to the first-string of wind turbines A to An to the cables and transformer between it and wind turbine B1, while the remaining cable section circuit breakers 41, 42, ..., 47 in the further string B are opened.

In the second operation mode, the cable section circuit breaker 41 between the first wind turbine B1 and an adjacent second wind turbine B2 is closed to supply active power P from the power generator G to the first and second wind turbines B1, B2 and to supply reactive power Q from the first wind turbine B1 to the cables and transformers between it and wind turbine B2, while the remaining cable section circuit breakers 42, 43, ..., 47 in the further string B are opened.

During the first and second operation modes, the cable section circuit breakers 41, 42, ..., 47 are sequentially closed starting out from the cable section circuit breaker 41 between the first and second wind turbines B1, B2 up to a cable section circuit breaker 47 between the n-th wind turbine Bn and the n–1-th wind turbine Bn–1, thereby sequentially supplying active power P from the power generator G to the first to n-th wind turbines B1, B2, ..., Bn and sequentially supplying/consuming reactive power Q to/from the wind turbines to a respective downstream cables and transformers.

In FIG. 3, once the whole first-string A (or a minimum number of wind turbines thereof) is energized, it is then possible to energize a further group of wind turbines, for example those of the at least one further string B, all at once by closing the further circuit breaker 40 of the further string B, this can be repeated in any other further string until the whole wind farm is energized, if required.

Figure 4:
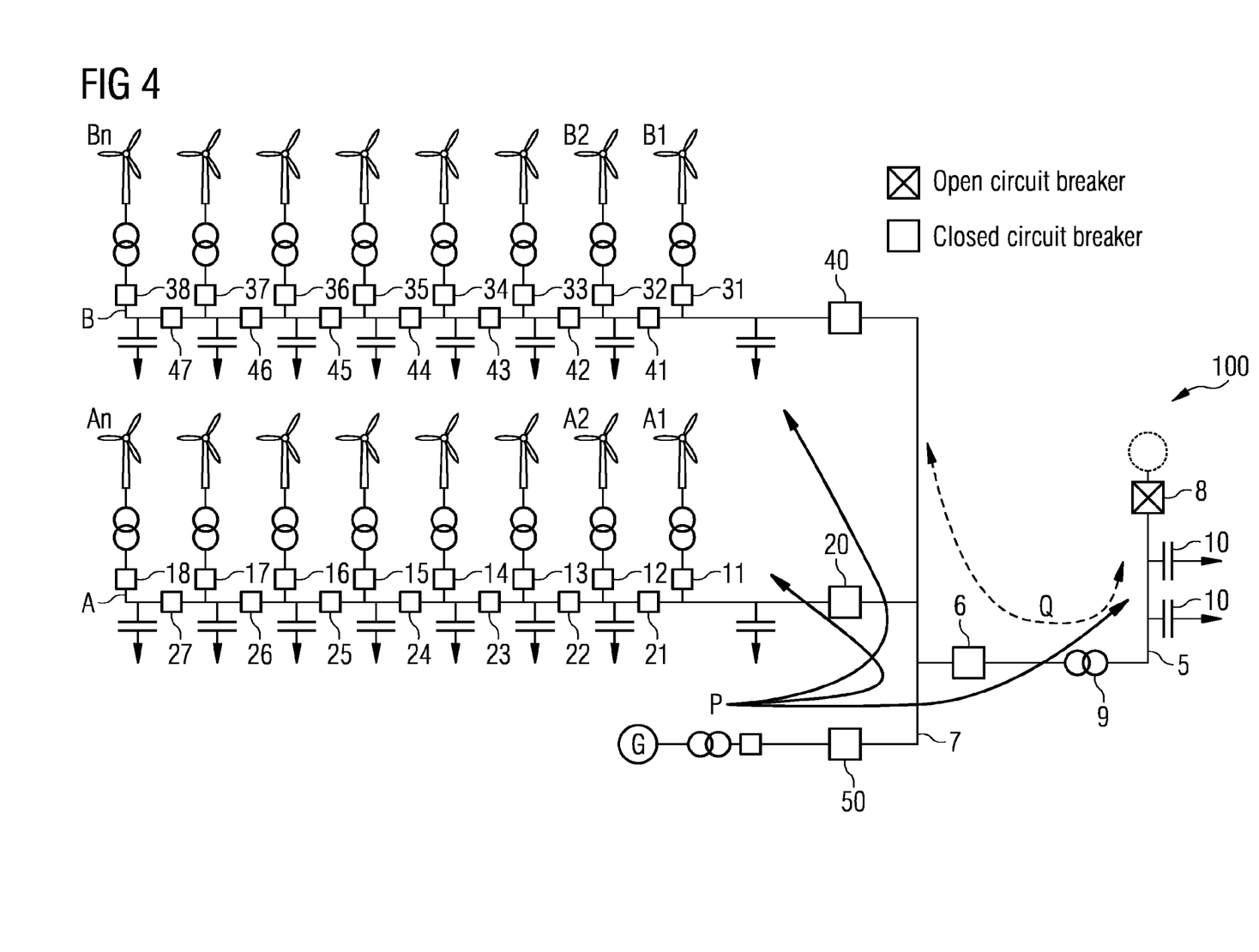
FIG. 4 shows the wind farm in another operation mode after the second operation mode.

FIG. 4 shows the wind farm in another operation mode after the second operation mode or after the operation of FIG. 3, where the circuit breakers between the power generator G, the n wind turbines of the first-string A and the n wind turbines of the second string B are closed. The two strings A, B of wind turbines have been energized using active power P supplied by the power generator G and are collectively balancing the reactive power load of the cables and transformers. The wind farm further comprises a grid supply line 5 which is connected via a grid supply line circuit breaker 6 to a bus bar 7 between the first wind turbine A1 and the power generator G. If a minimum number of wind turbines in the first-string A and/or the at least one further string B are energized and therefore collectively providing sufficient reactive power balancing capability, the grid supply line circuit breaker 6 is closed, as shown in FIG. 4, to supply active power P to and reactive power Q to/from the bus bar 7 between the first wind turbines A1, B1 and the power generator G to the grid supply line 5.

The grid supply line 5 is connected to a grid 100 via a grid circuit breaker 8, wherein the grid supply line 5 comprises, between the grid supply line circuit breaker 6 and the grid circuit breaker 8, a grid transformer 9 and transmission lines 10, wherein the grid circuit breaker 8 is opened when performing the operation modes of the embodiments in FIGS. 1 to 3, i.e., when a number smaller than minimum number of wind turbines in the first-string A and/or the at least one further string B are energized.

In FIG. 4, once a minimum number of wind turbines of the wind farm is energized, they are then capable of energizing power system components such as a grid transformer 9 and the transmission lines 10.

In summary, FIG. 1 shows the energization of the first wind turbine A1 using the power generator G as an energy source. FIG. 2 shows how the combination of the first wind turbine A1 and the power generator G can energize the second, third, fourth and further wind turbines up to the minimum required number of wind turbines of the first-string A to allow a further group in the further string B to be energized at once. FIG. 3 shows how the first group of wind turbines in the first-string A energizes a second group of wind turbines in the further string B, which can be repeated until the whole wind farm is energized if required. FIG. 4 shows how a group of wind turbines, of minimum size, can energize other power system components.

The wind farm can self-energize and maintain the energization of itself and parts of the transmission system when the wind speed is too low for power production by the wind turbines themselves.

The size of the power generator G or an additional energy source, which is required to energize/maintain the energization of the wind farm in the low wind condition, can be relatively small in comparison to the rated power of the wind farm.

This capability would bring further advantages, as it would allow you to perform a black start of the grid regardless of the wind speed. It would also remove the need for a wind farm operator to install temporary large diesel generators and reactive compensation equipment, if a prolonged grid outage is expected, to maintain the wind farm climatic control.

Embodiments of the present invention also avoid the provision of a standalone diesel generator or energy storage device which must be sized to provide the same reactive power capability of all of the wind turbine power converters as well as the active power loads. Such a large diesel generator or storage device would dramatically increase the cost.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of supplying power to a wind farm, the wind farm comprising a plurality of wind turbines which are connected in parallel to each other in a first string, wherein respective cable section circuit breakers are arranged between adjacent wind turbines of the first string; and a power generator which is connected to a first wind turbine of the first string, wherein a first string circuit breaker is arranged in a line between the power generator and the first wind turbine;

wherein the method comprises the following operation modes in a low wind condition, where a wind speed falls below a threshold value:
a first operation mode where the first string circuit breaker is closed to supply active power from the power generator to the first wind turbine and to supply or consume reactive power from or to the power generator to or from a passive cable and/or transformer between the power generator and the first wind turbine, while the remaining cable section circuit breakers in the first string are opened;
a second operation mode after the first operation mode, where a cable section circuit breaker between the first wind turbine and an adjacent second wind turbine is closed to supply active power from the power generator to the first and second wind turbines and to supply or consume reactive power from or to the first wind turbine to or from the passive cable and/or transformer between the first wind turbine and the second wind turbine, while the remaining cable section circuit breakers in the first string are opened.

2. The method according to claim 1, wherein:
the wind farm comprises n wind turbines in the first string, wherein the first wind turbine is the most upstream wind turbine in the first string and the n-th wind turbine is the most downstream wind turbine in the first string;
the method comprising:
sequentially closing the cable section circuit breakers starting out from the cable section circuit breaker between the first and second wind turbines up to a cable section circuit breaker between the n-th wind turbine and the n−1-th wind turbine, thereby sequentially supplying active power from the power generator to the first to n-th wind turbines and sequentially supplying or consuming reactive power from or to the wind turbines to or from a respective downstream passive cable and/or transformer.

3. The method according to claim 1, wherein
the wind farm further comprises at least one further plurality of wind turbines which are connected in parallel to each other in at least one further string, wherein respective cable section circuit breakers are arranged between adjacent wind turbines of the at least one further string; wherein the power generator is connected to a first wind turbine of the at least one further string, wherein at least one further string circuit breaker is arranged in a line between the power generator and the first wind turbine of the at least one further string,
wherein the method further comprises, after closing the wind turbine circuit breaker between the n-th wind turbine and the n−1-th wind turbine of the first string, performing the first and second operation modes in the at least one further string in the same manner as in the first string, and/or performing sequentially closing the cable section circuit breakers in the at least one further string in the same manner as in the first string;
wherein reactive power is also supplied or consumed from or to the wind turbines of the first string to or from the passive cable and/or transformer of the further string.

4. The method according to claim 1, wherein
the wind farm further comprises a grid supply line which is connected via a grid supply line circuit breaker to a bus bar between the first wind turbine and the power generator, wherein, if a minimum number of wind turbines in the first string is operating, the grid supply line circuit breaker is closed to supply active power and supply or consume reactive power from or to the bus bar between the first wind turbine and the power generator to or from the grid supply line.

5. The method according to claim 4, wherein
the grid supply line is connected to a grid via a grid circuit breaker, at a distant end, wherein the grid supply line comprises, between the grid supply line circuit breaker and the grid circuit breaker, a grid transformer and/or a transmission line, wherein the grid circuit breaker is opened when performing the steps.

6. The method according to claim 1, wherein the wind farm comprises at least one of the following:
each wind turbine in the first string comprises a corresponding wind turbine connection circuit breaker to connect or interrupt the respective wind turbine to or from the first string;
each wind turbine in the at least one further string comprises a corresponding wind turbine circuit breaker to connect or interrupt the respective wind turbine to or from the at least one other string;
the power generator is connected to the first string via a power generator circuit breaker, wherein the power generator circuit breaker is closed in the low wind condition and opened in conditions other than the low wind condition.

7. A wind farm comprising:
a plurality of wind turbines which are connected in parallel to each other in a first string, wherein respective cable section circuit breakers are arranged between adjacent wind turbines of the first string;
a power generator which is connected to a first wind turbine of the first string, wherein a first string circuit breaker is arranged in a line between the power generator and the first wind turbine; and
a control device which is configured to operate the wind farm in the following operation modes in a low wind condition, where a wind speed falls below a threshold value:
a first operation mode where the first string circuit breaker is closed to supply active power from the power generator to the first wind turbine and to supply or consume reactive power from or to the power generator to or from the passive cable and/or transformer between the power generator and the first wind turbine, while the remaining cable section circuit breakers in the first string are opened;
a second operation mode after the first operation mode, where a cable section circuit breaker between the first wind turbine and an adjacent second wind turbine is closed to supply active power from the power generator to the first and second wind turbines and to supply or consume reactive power from or to the first wind turbine to or from the passive cable and/or transformer between the first wind turbine and the second wind turbine, while the remaining cable section circuit breakers in the first string are opened.

8. The wind farm according to claim 7, wherein:
the wind farm comprises n wind turbines in the first string, wherein the first wind turbine is the most upstream wind turbine in the first string and the n-th wind turbine is the most downstream wind turbine in the first string;
the control device is configured to:
sequentially close the cable section circuit breakers starting out from the cable section circuit breaker between the first and second wind turbines up to a cable section circuit breaker between the n-th wind turbine and the n−1-th wind turbine, thereby sequentially supplying active power from the power generator to the first to n-th wind turbines and sequentially supplying or consuming reactive power from or to the wind turbines to or from a respective downstream passive cable and/or transformer.

9. The wind farm according to claim 7, wherein
the wind farm further comprises at least one further plurality of wind turbines which are connected in parallel to each other in at least one further string, wherein respective cable section circuit breakers are arranged between adjacent wind turbines of the at least one further string; wherein the power generator is connected to a first wind turbine of the at least one further string, wherein at least one further string circuit breaker is arranged in a line between the power generator and the first wind turbine of the at least one further string, wherein, after closing the wind turbine circuit breaker between the n-th wind turbine and the n−1-th wind turbine of the first string, the control device is further configured to:

perform the first and second operation modes in the at least one further string in the same manner as in the first string, and/or perform sequentially closing the cable section circuit breakers in the at least one further string in the same manner as in the first string;

wherein reactive power is also supplied or consumed from or to the wind turbines of the first string to or from a passive cable and/or transformer of the further string.

10. The wind farm according to claim 7, wherein
the wind farm further comprises a grid supply line which is connected via a grid supply line circuit breaker to a bus bar between the first wind turbine and the power generator, wherein, if a minimum number of wind turbines in the first string is energized, the control device is configured to close the grid supply line circuit breaker to supply active power and supply or consume reactive power from or to the bus bar between the first wind turbine and the power generator to or from the grid supply line.

11. The wind farm according to claim 10, wherein
the grid supply line is connected to a grid via a grid circuit breaker, wherein the grid supply line comprises, between the grid supply line circuit breaker and the grid circuit breaker, a grid transformer and/or a transmission line, wherein the control device is configured to open the grid circuit breaker when performing the steps.

12. The wind farm according to claim 7, wherein the wind farm comprises at least one of the following:

each wind turbine in the first string comprises a corresponding wind turbine circuit breaker to connect or interrupt the respective wind turbine to or from the first string;

each wind turbine in the at least one further string comprises a corresponding wind turbine circuit breaker to connect or interrupt the respective wind turbine to or from the at least one other string;

the power generator is connected to the first string via a power generator circuit breaker, wherein the control device is configured to close the power generator circuit breaker in the low wind condition and opened in conditions other than the low wind condition.

* * * * *